United States Patent [19]

Carlson et al.

[11] 3,766,313

[45] Oct. 16, 1973

[54] CIRCUIT FOR TRANSMITTING DIGITAL SIGNALS TO CONVENTIONAL TELEVISION RECEIVER

[75] Inventors: David John Carlson; John Barrett George, both of Indianapolis, Ind.

[73] Assignee: RCA Corporation, New York, N.Y.

[22] Filed: Aug. 7, 1972

[21] Appl. No.: 278,264

[52] U.S. Cl. ......... 178/7.2, 178/7.3 R, 178/DIG. 22, 332/52, 340/324 A

[51] Int. Cl. ......... H03c 1/14, G06f 3/14, H04n 5/40

[58] Field of Search ................... 332/52, 55, 56, 53, 332/9 R, 9 T, 11, 62; 325/105, 140, 38; 340/324 A, 324 D; 331/75, 182; 178/7.1, 7.2, 7.3 R, 6 B, 5.4 TE, DIG. 22; 235/170, 198

[56] References Cited

UNITED STATES PATENTS 2,393,785 1/1946 Leeds .................................. 332/56

2,875,414 2/1959 Wlasuk ................................ 332/52

3,202,940 8/1965 Dietrick ............................... 332/56

3,685,039 8/1972 Flanagan ...................... 340/324 AD

*Primary Examiner*—Robert L. Griffin
*Assistant Examiner*—John C. Martin
*Attorney*—H. Christoffersen et al.

[57] ABSTRACT

A desk top calculator or other generator of digitized video signals is coupled to the antenna terminals of a conventional television receiver. A circuit within the generator translates the digitized video signals into a modulated TV R-F picture carrier. The circuit includes a radio-frequency source, and a network of diode switchable attenuators. The latter are operated in response to control signals for switching the radio-frequency signal between three discrete levels. Two of the levels are for the display of black and white, respectively, and the third level is a "blacker than black" synchronization level.

6 Claims, 6 Drawing Figures

CIRCUIT FOR TRANSMITTING DIGITAL SIGNALS TO CONVENTIONAL TELEVISION RECEIVER

BACKGROUND OF THE INVENTION

A home television receiver may be employed for displaying not only the usual over the air programs but other information as well. For example, the receiver may be employed as a video terminal for displaying alphanumeric characters as discussed in Evans et al. U.S. Pat. No. 3,017,625, or for the display of bar graphs as discussed in Marko U.S. Pat. No. 3,530,236, or the receiver may be employed to display the results of calculations performed by a desk top calculator. It is often desirable in these kinds of applications that there be relatively few modifications to the television receiver itself. One reason is the cost of making such modifications in the field. There are others. One way of keeping such modifications to a minimum is to modulate the signals produced by the auxiliary circuit onto a radio-frequency carrier and to apply the modulated carrier to the antenna terminals of the television receiver.

SUMMARY OF THE INVENTION

The present invention resides in a particular way of modulating a radio-frequency carrier which is especially suitable for use in displaying characters, such as numbers or the like, on the screen of a television receiver. The modulation places a radio-frequency signal of any strength at one of only three different relative levels, two of these levels being indicative of black and white, respectively, and the third being for the purpose of synchronization. The modulating arrangement includes a network of attenuators and switch means, the switch means being operated to permit the radio-frequency signal to take one of three different paths, each exhibiting a different attenuation.

DETAILED DESCRIPTION

Figure 1:
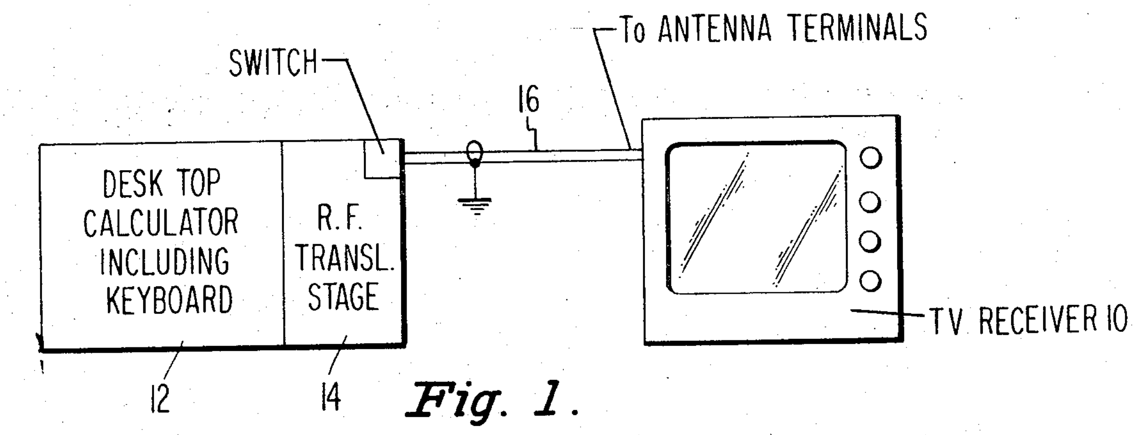
FIG. 1 is a block diagram of a system embodying the present invention.

The system shown in FIG. 1 is a typical environment in which the present invention may be embodied. The television receiver 10 is a conventional home entertainment type instrument. The desk top calculator 12 operates similarly to many models of calculators which are commonly available today. The present invention has to do with the stage 14 for translating the digital signal produced by the calculator 12 into a form suitable for application to the antenna terminals of the TV receiver. These signals are conveyed to the receiver via a 75 ohm co-axial cable 16. For some receivers, the cable impedance matches the input impedance of the receiver. For others, a simple impedance transformer (not shown) may be used, at the receiver, for providing the required impedance conversion.

Figure 2:
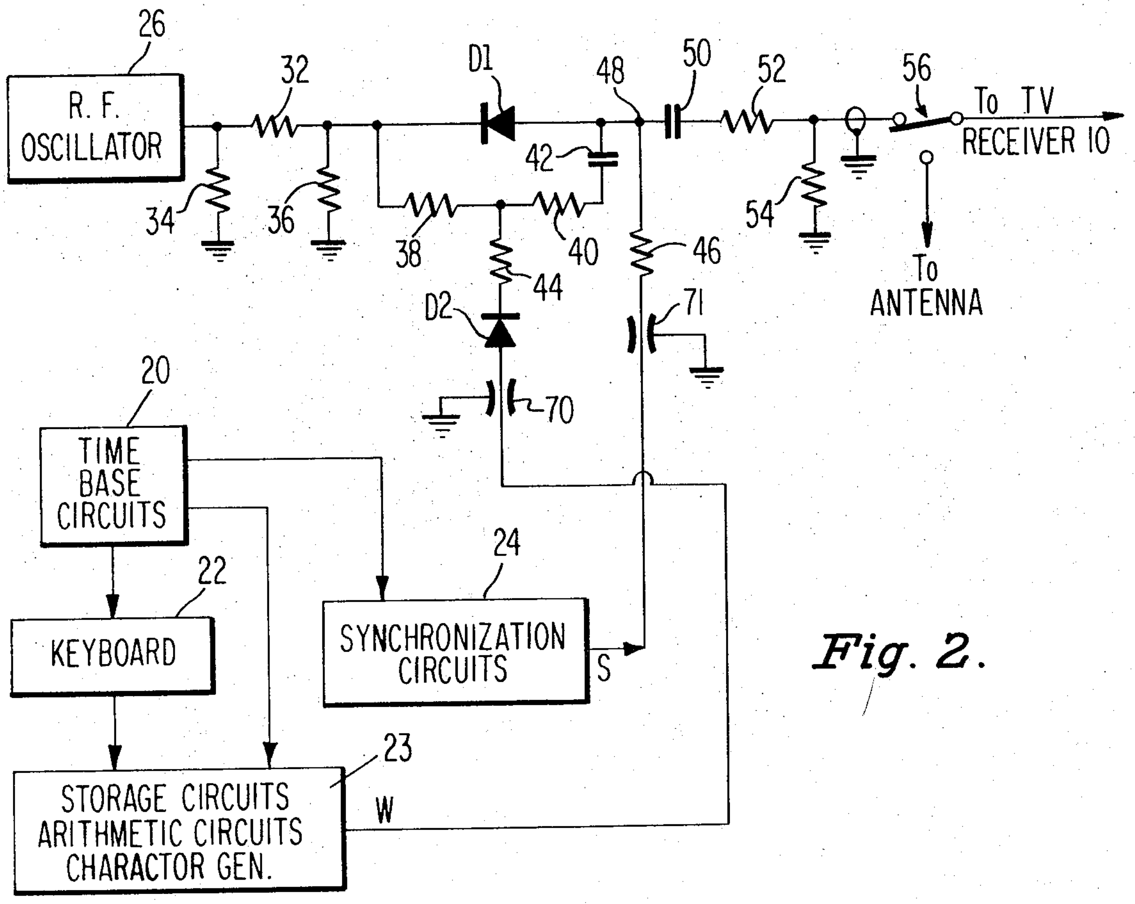
FIG. 2 is a block and circuit diagram of a portion of the arrangement shown in FIG. 1.

The desk top calculator, which operates in conventional fashion, is illustrated by its basic block diagram in FIG. 2. It includes time base circuits 20 for controlling all of the remaining circuits. In response to the depression of keys on the keyboard 22 and under control of the time base circuits 20, binary coded characters are transmitted to storage circuits such as shift registers or the like. These characters are then operated on (added, subtracted, or processed in other ways) by the arithmetic circuits to produce the results called for by the keyboard directed commands. The results are then employed to generate the signals necessary for modulating the radio-frequency carrier, as will be discussed shortly. These signals may be read from a character generator in synchronism with the display of the television receiver.

Figure 3:
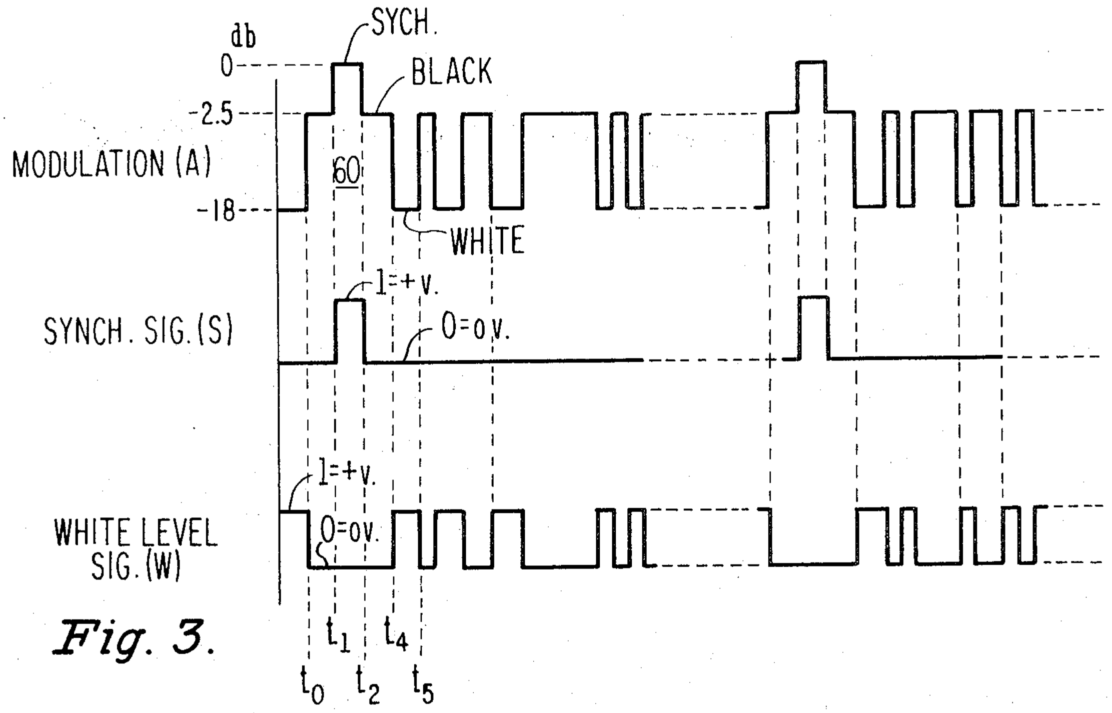
FIG. 3 is a drawing of waveforms to help explain the operation of the circuit of FIG. 2.

The time base circuits 20 also control the synchronization circuits 24 which produce the signals necessary for synchronizing the television receiver. As is well understood in this art, these synchronization signals occur at the horizontal and vertical synchronizing frequencies of the television receiver. The form that these signals take is well known in the art and may be found in texts such as: "Reference Data for Radio Engineers," Fifth Edition, FIG. 19, p. 28–14, Howard W. Sams and Co., Inc., Indianapolis, Ind. 1968. FIG. 3 of the present application illustrates the use of the synchronous signal in the present circuit.

Stage 14 of FIG. 1 includes a radio-frequency oscillator 26 shown in FIG. 2 which operates at the frequency of one of the television channels—preferably an unused channel. For example, the frequency may be 61,25 MHz, the picture carrier frequency for channel 3. The oscillator connects to a Pi ($\pi$) attenuator which includes a series resistor 32 and two shunt resistors 34 and 36. Following this Pi attenuator, is a series path which includes resistors 38 and 40 and a DC blocking capacitor 42. A first diode D1 is in shunt with this path. The character generator within block 23 connects through a second diode D2 and resistor 44 to the junction between resistors 38 and 40. A capacitor 70 bypasses the diode D2 for radio-frequency. The synchronization circuits 24 are connected through resistor 46 to the common connection 48 to capacitor 42 and the anode of diode 41. A capacitor 71 provides a radio-frequency ground for resistor 46. The output end of the network is a Pi attenuator which includes DC blocking capacitor 50, series resistor 52 and shunt resistors 54 and 46. Switch 56 is simply for the purpose of disconnecting the entire circuit from the television receiver when it is desired to use the television receiver for usual home entertainment purposes.

To provide proper modulation to the television receiver for the display of alphanumeric characters, the signal on the carrier should be as shown at A in FIG. 3 The first portion of the wave shown at 60 comprises the usual horizontal line television synchronization signal. It includes a synchronization signal of relatively short duration superimposed on a black level signal of relatively longer duration. The black level signal may be about 2.5db down from the synchronization level and the write level signal down about 18db from the synchronization level.

During the horizontal line time, the modulation will vary between two levels, the higher one indicative of black and the lower one indicative of white. The video signal obtained from demodulating the carrier in the TV receiver, which video signal should correspond to what is actually shown in FIG. 3, provides, after amplification, the necessary intensity modulation for the electron beam of the kinescope in the receiver, to cause the white dots or marks on the screen, which dots or marks form the characters.

Figure 5:
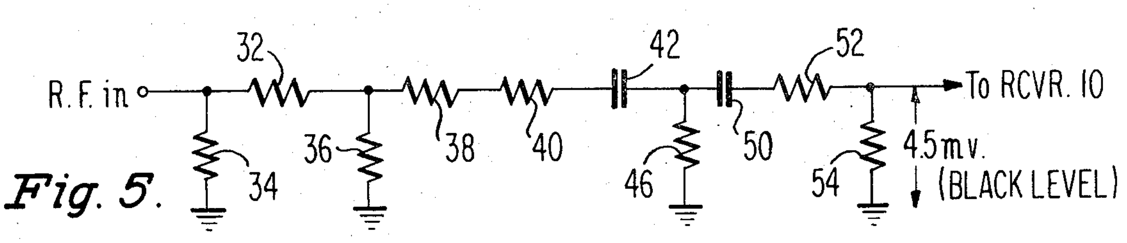

In the circuit of the present application, the modulation shown at A in FIG. 3 is obtained by causing the diodes D1 and D2 to conduct or not in accordance with the synchronization signals S and white level signals W supplied by the circuits 24 and 23, respectively. The diodes normally may be slightly back-biased by a positive direct voltage level present at the output lead of the R-F oscillator 26, although this is not essential. During the period $t_0$ to $t_1$ of FIG. 3, the white level signal produced by the circuit 23 may be at zero volts, representing binary 0, so that diode D2 does not conduct. The synchronization signal S produced by circuit 24 also may be at zero volts, representing binary 0, so that diode D1 does not conduct. The equivalent circuit under these conditions is shown in FIG. 5. Diodes D1 and D2 act like open switches and are essentially out of the circuit. The radio-frequency signal therefore takes the path through resistors 38 and 40. The input resistors 32, 34 and 36 are simply an impedance matching attenuator circuit and similarly the resistors 46, 52 and 54 are impedance matching attenuator circuits. They isolate the circuit from the source 26 and receiver 10, that is, both the oscillator 26 and receiver 10 "see" a fixed value of impedance. The capacitors 42 and 50 are simply decoupling devices for preventing direct currents from taking undesired paths.

With the circuit operating in the manner shown in FIG. 5, the radio-frequency signal produced is about 2.5db down from a reference level and may be at a voltage level of say 4.5 millivolts. (Actual values of circuit elements will be given later.) This voltage level corresponds to the black level of wave 60. The reference level is the synchronization level as shown in FIG. 3 at A.

Figure 4:
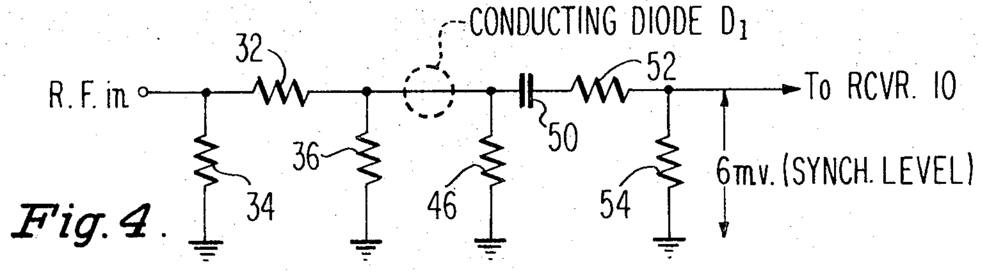
FIGS. 4–6 are equivalent circuits to help explain the operation of the circuit of FIG. 2.

During the period from $t_1$ to $t_2$ in FIG. 3, the synchronization circuits 24 apply a positive level +V indicative of binary 1 to the circuit. The voltage amplitude is sufficient to place diode D1 in its conducting condition. The effect is that of closing a switch in shunt with the path 38, 40, 42. During this time period $t_1$ to $t_2$, the circuits 23 continue to apply zero potential to the diode D2 maintaining diode D2 cut off. The operation which results is depicted in the equivalent circuit of FIG. 4. The path taken by the radio-frequency signal now is a low impedance path so that the radio-frequency output signal is at a higher level—6 millivolts, for example. This corresponds to the synchronization level of the wave 60 of FIG. 3 and is the 0db or reference level chosen in this example of the invention.

During the period $t_4$ to $t_4$ in FIG. 3, a white level signal is obtained. This is accomplished by maintaining the signal S level at zero volts to cut off diode D1 and by applying a white level signal W which is relatively positive to the extent of +V volts to the diode D2. This relatively positive signal places diode D2 in a conducting condition.

Figure 6:
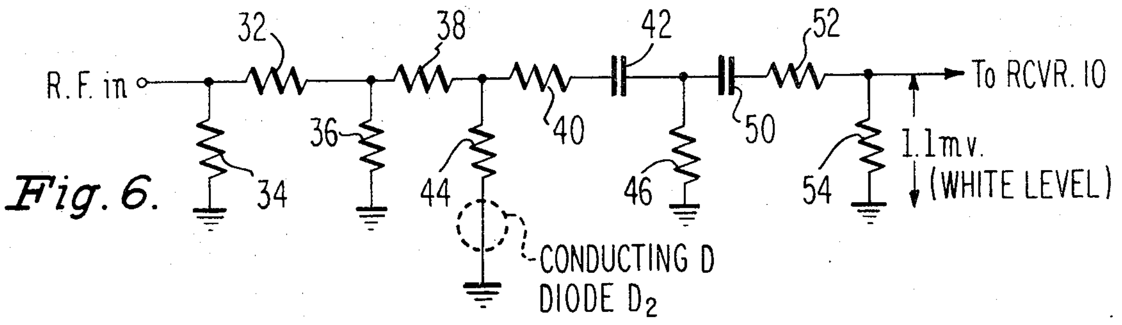

The equivalent circuit for the operation described above is shown in FIG. 6. There is now a shunt path, comprising the resistor 44, connected between the common connection of resistors 38 and 40 and ground. The result is that portion of the radio-frequency signal is shunted to ground and the output signal level is decreased approximately 18db from the synchronization signal level. For a 6MV synchronization signal level, this low level is at 0.8 millivolts and corresponds to the white level.

An important feature of the present invention is that variations in the power level of the R-F oscillator 26 have no substantial effect on the circuit operation. Regardless of the power output (within reasonable limits), the circuit establishes a reference level which, in this particular example, is the synchronization level. The other two output levels are then referenced to this reference level; one—the black level is 2.5db down from the reference level; the other—the white level is 18db down from the reference level. All of this is done with relatively simple circuit elements—resistors operating as attenuators and diodes operating as switches for controlling which attenuators are in the circuit.

Also, variations in the control signal W and S levels, within reasonable limits, have no effect on the circuit operation. All that is needed is that the control signal amplitude be sufficient to cause the diode to conduct reasonable current.

As implied above, the invention is not restricted to the selection of the synchronization level as the reference level. The white level, for example, could be chosen instead and attenuator networks switched out of or into the circuit (depending on whether in series or shunt paths) to provide signals having the desired fixed relationships to the reference level, regardless of variations in the radio-frequency power.

Typical values of various parameters for the circuit of FIG. 2 are given below. It is to be understood that these are examples only and are not intended to limit the scope of the invention.

| | |
|---|---|
| Resistors 32 and 52 | 68 ohms |
| Resistors 34, 36, 46 and 54 | 100 ohms |
| Resistors 38 and 40 | 15 ohms |
| Resistor 44 | 10 ohms |
| Capacitors 42, 50, 70, and 71 | 0.001 microfarads |
| Diodes D1 and D2 | Type BA-136 |

The lines carrying the S and W signals are preferably shielded as are the lines from the oscillator and to the antenna terminals, to reduce R-F oscillator radiation.

What is claimed is:

1. A circuit for producing a signal suitable for application to the antenna terminals of a television receiver comprising, in combination:
 - a radio-frequency source;
 - a network coupled to said source, said network including a series path of relatively high attenuation, first switch means in shunt with said path, a shunt attenuation path coupled to said series path, and second switch means in series with said shunt path; and
 - control circuit means for operating said switch means for, in one case closing only the first switch means to produce a radio-frequency signal at a first relatively high level for synchronization purposes, and, in a second case, maintaining both switch means open for producing a radio-frequency signal at a second, lower level indicative of black and, in a third case, closing only said second switch means for producing a radio-frequency signal at a third, lower level indicative of white.

2. A circuit as set forth in claim 1 wherein each switch means comprises a diode.

3. A circuit for producing a signal suitable for application to the antenna terminals of a television receiver comprising, in combination:

a radio-frequency source,
an output terminal;
two series paths of different attenuation coupled between said source and output terminal;
a third attenuation path coupled between one of said series paths and the point of reference potential;
means for selectively placing the three paths in one of the following conditions:
1. one series path open, the other closed and the shunt path open;
2. both series paths closed and the shunt path open;
3. one series path open and the other closed and the shunt path closed.

4. A circuit for producing a signal suitable for application to the antenna terminals of a television receiver comprising, in combination:
a radio-frequency source;
a pair of output terminals;
a network having a plurality of attenuation paths therethrough coupled between said source and said output terminals; and
means including two switch means in two of said paths, respectively, for selectively opening and closing said paths to provide radio-frequency signals between said output terminals indicative of black, white and synchronization signal levels.

5. A circuit as set forth in claim 4 wherein said paths include resistance means and said switch means comprise diodes.

6. A circuit for producing a signal suitable for application to the antenna terminals of a television receiver comprising, in combination:
a radio-frequency source;
attenuation circuit means coupled to said source for deriving from said source a radio-frequency signal at a reference level indicative of one of the synchronization, black and white levels, said reference level depending upon the level of the radio-frequency signal; and
second and third switch controlled attenuation circuits coupled to said first circuit and responsive to control signals for deriving from the radio-frequency signal at said reference level, radio-frequency signals at said other two levels, said other two levels being at fixed power ratios relative to said reference level.

* * * * *

UNITED STATES PATENT OFFICE
CERTIFICATE OF CORRECTION

Patent No. 3,766,313 Dated October 16, 1973

Inventor(s) D. J. Carlson and J. B. George

It is certified that error appears in the above-identified patent and that said Letters Patent are hereby corrected as shown below:

Column 3, line 43 "time" should be --same--;
Column 3, line 53 "$t_4$" second occurrence should be --$t_5$--.
Column 3, line 64 insert "a" before --portion--.

Signed and sealed this 26th day of March 1974.

(SEAL)
Attest:

EDWARD M.FLETCHER,JR.
Attesting Officer

C. MARSHALL DANN
Commissioner of Patents